(12) United States Patent
Shirahama

(10) Patent No.: US 8,741,498 B2
(45) Date of Patent: Jun. 3, 2014

(54) FUEL CELL

(75) Inventor: Junichi Shirahama, Toyota (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 11/920,443

(22) PCT Filed: Mar. 6, 2007

(86) PCT No.: PCT/IB2007/000531
§ 371 (c)(1),
(2), (4) Date: Nov. 15, 2007

(87) PCT Pub. No.: WO2007/102073
PCT Pub. Date: Sep. 13, 2007

(65) Prior Publication Data
US 2009/0068513 A1    Mar. 12, 2009

(30) Foreign Application Priority Data
Mar. 7, 2006    (JP) ................. 2006-060891

(51) Int. Cl.
*H01M 8/04* (2006.01)
*H01M 8/24* (2006.01)
*H01M 8/10* (2006.01)

(52) U.S. Cl.
USPC ............ 429/457; 429/469; 429/483; 429/532

(58) Field of Classification Search
None
See application file for complete search history.

(56) References Cited

U.S. PATENT DOCUMENTS

| | | | | |
|---|---|---|---|---|
| 7,510,795 | B2* | 3/2009 | Sakano et al. | 429/406 |
| 2002/0177019 | A1* | 11/2002 | Aoto et al. | 429/22 |
| 2004/0028969 | A1* | 2/2004 | Aoto | 429/23 |

FOREIGN PATENT DOCUMENTS

| | | | | |
|---|---|---|---|---|
| JP | 2004-063176 A | | 2/2004 | |
| JP | 2004-079193 A | | 3/2004 | |
| JP | 2005-093395 | * | 4/2005 | ............ H01M 8/04 |
| JP | 2005-093395 A | | 4/2005 | |
| JP | 2005-293924 | * | 10/2005 | ............ H01M 8/04 |
| JP | 2005-293924 A | | 10/2005 | |
| JP | 2006-024411 A | | 1/2006 | |
| WO | WO 03/079500 A | | 9/2003 | |

OTHER PUBLICATIONS

Office Action issued Jan. 16, 2012 in Japanese Patent Application No. 2006-060891 & English translation thereof.

* cited by examiner

*Primary Examiner* — Barbara Gilliam
*Assistant Examiner* — Angela Martin
(74) *Attorney, Agent, or Firm* — Kenyon & Kenyon LLP

(57) ABSTRACT

In a fuel cell, one of separators that are opposed to each other and an intermediate body interposed between the separators are sandwiched by a cell monitor. An end portion of the intermediate body extends to an edge portion of a cell monitor mounting portion of the above-indicated one separator. The intermediate body includes at least one of a member that functions to hold an electrolyte body, a spacer (as in the case where the intermediate body is a resin frame), and a seal member or members. A major surface of the separator in the cell monitor mounting portion on which the cell monitor is mounted is in surface contact with a terminal of the cell monitor for conduction therebetween.

9 Claims, 7 Drawing Sheets

FUEL CELL

This is a 371 national phase application of PCT/IB2007/000531 filed 6 Mar. 2007, claiming priority to Japanese Patent Application No. 2006-060891 filed 7 Mar. 2006, the contents of which are incorporated herein by reference.

FIELD OF THE INVENTION

The invention relates to a fuel cell, and in particular to a portion of the fuel cell on which a cell monitor is mounted.

BACKGROUND OF THE INVENTION

A unit cell of a fuel cell system includes a membrane electrode assembly (MEA) that is sandwiched by and between separators. When the separators are in the form of metal separators, a structural material (such as a resin frame) may be interposed between the MEA and each of the separators. A plurality of such unit cells are stacked together to form a fuel cell stack. A cell voltage monitor (which will be hereinafter called "cell monitor") for measuring voltage is mounted on each cell (or unit cell) or a suitable number of cells of the fuel cell stack. As disclosed in JP-A-2004-63176, or as shown in FIG. 7, a cell monitor 1 is mounted on a fuel cell such that only one of a pair of separators 2 of a unit cell is sandwiched by the cell monitor 1.

However, the cell monitor mounting structure as described above has the following problem. Since the cell monitor is mounted on and held by a single sheet of separator, the separator may be bent or broken if excessively large external force is applied to the cell monitor, and it is thus necessary to provide a cell monitor mounting portion of the cell with high rigidity and high strength. In the case where the separator comprises a thin metal separator, in particular, the separator is likely to be deformed or bent to be broken, and, therefore, it is highly desired to improve the rigidity and strength of the cell monitor mounting portion of the fuel cell.

DISCLOSURE OF THE INVENTION

It is an object of the invention to provide a fuel cell in which a cell monitor mounting portion has improved rigidity and strength.

A first aspect of the invention relates to a fuel cell in which one of a pair of separators that are opposed to each other and an intermediate body interposed between the separators are sandwiched by a cell monitor. For example, an end portion of the intermediate body extends to an edge portion of a cell monitor mounting portion of the above-indicated one of the opposed separators, so as to enable the cell monitor to sandwich the one separator and the intermediate body. In this case, the end portion of the intermediate body is also a part of the cell monitor mounting portion. In the fuel cell of the invention, the intermediate body may include at least one of a member that functions to hold an electrolyte body, a spacer (as in the case where the intermediate body is a resin frame) between the separators, and a seal member or members. Preferably, a major surface of the separator in the cell monitor mounting portion on which the cell monitor is mounted is in surface contact with a terminal of the cell monitor for conduction therebetween. For example, each of the separators comprises a metal separator, and the intermediate body comprises a resin frame serving as a spacer between the separators.

In the fuel cell according to the first aspect of the invention, the cell monitor sandwiches the intermediate body along with the separator, and, therefore, the cell monitor mounting portion of the fuel cell has increased strength and rigidity, as compared with the case (e.g., the fuel cell as disclosed in JP-A-2004-63176) in which the cell monitor holds only the separator. Where the separator is a metal separator, and the intermediate body is a resin frame, the metal separator and one or more sheets of the resin frame(s) are both sandwiched by the cell monitor according to the invention, thus assuring increased strength and rigidity of the cell monitor mounting portion of the fuel cell, as compared with the case where only a single thin sheet of metal separator having relatively low rigidity is sandwiched by the cell monitor. In the case where a major surface of the separator in the cell monitor mounting portion on which the cell monitor is mounted is in surface contact with the terminal of the cell monitor for conduction therebetween, the area of contact between the cell and the cell monitor can be increased, and contact resistance can be reduced, as compared with the case where an end face of a thin separator is in contact with the terminal of the cell monitor.

A second aspect of the invention relates to a fuel cell including a pair of separators that are opposed to each other, and an intermediate body interposed between the separators. A separator of one of the opposed separators and the intermediate body have an engaging portion or portions to be engaged with a cell monitor. The engagement mentioned herein includes engagement in the form of sandwiching, engagement using protrusions, and other forms of engagement.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF PREFERRED EMBODIMENTS

Referring to FIG. 1 through FIG. 5, a fuel cell according to the first embodiment of the invention will be described. The fuel cell to which the invention is applied is, for example, a polymer electrolyte fuel cell 10. The fuel cell 10 is installed on, for example, a fuel cell vehicle. It is, however, to be understood that the fuel cell may be used in applications other than vehicles.

Figure 3:
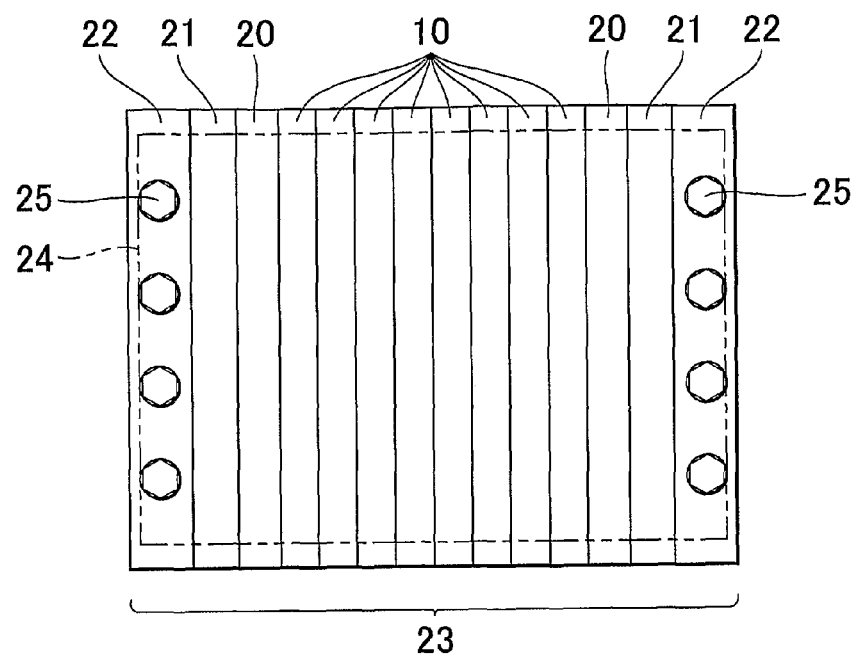
FIG. 3 is a side view of a fuel cell stack that incorporates fuel cells of the first embodiment.
Figure 4:
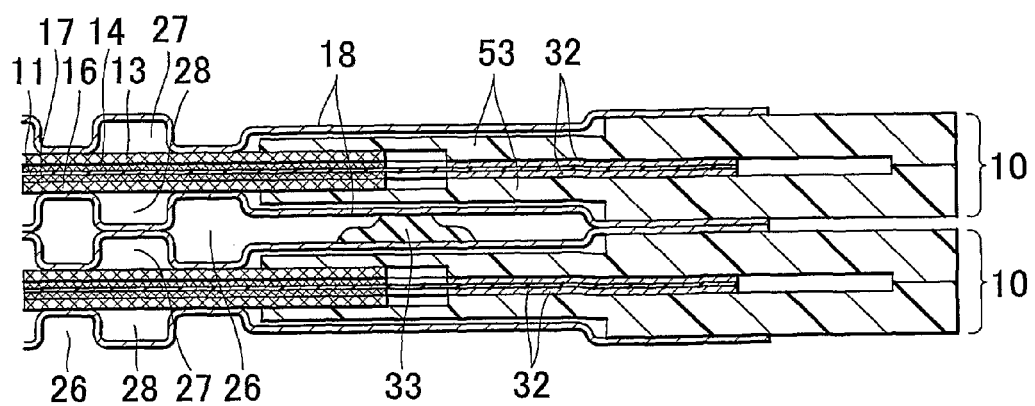
FIG. 4 is an enlarged, cross-sectional view of a part of the fuel cell stack of FIG. 3.

As shown in FIG. 4, the polymer electrolyte fuel cell 10 is formed from a laminated structure of a membrane electrode assembly (MEA) and separators 18. The membrane electrode assembly consists of an ion exchange membrane (electrolyte membrane) 11, an electrode (anode, fuel electrode) 14 comprising a catalyst layer disposed on one surface of the electrolyte membrane 11, and an electrode (cathode, air electrode) 17 comprising a catalyst layer disposed on the other surface of the electrolyte membrane 11. Diffusion layers (which may also be called "gas diffusion layers") 13, 16 are provided between the membrane electrode assembly and the separator 18 on the side of the anode and between the membrane electrode assembly and the separator 18 on the side of the cathode. The membrane electrode assembly and the separators 18 are laminated or superimposed on each other to provide a cell 10. As shown in FIG. 3, a plurality of cells 10 are stacked together into a stacked structure or cell stack, and terminals 20, insulators 21 and end plates 22 are disposed at the opposite ends of the stacked structure in the direction in which the cells are stacked (this direction will be referred to as "cell stacking direction"). The end plates 22 are fixed with bolts and nuts 25 to a fastening member (such as a tension plate 24) that extends in the cell stacking direction, at the outside of the stacked structure of the cells, and a load is applied from the fastening member to the stacked structure in the stacking direction, so as to provide a fuel cell stack 23.

Figure 5:
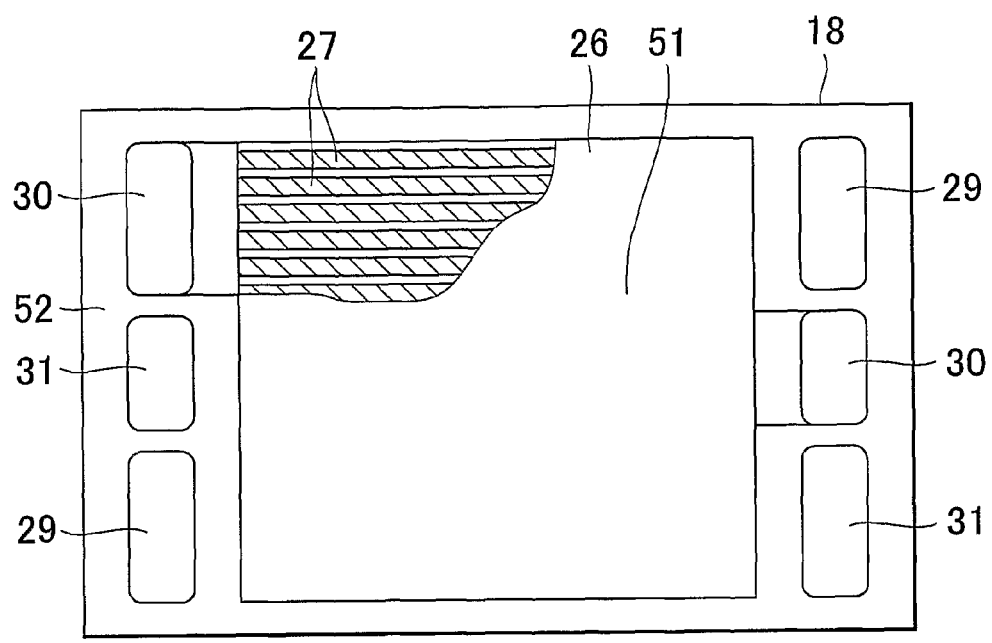
FIG. 5 is a schematic front view of a cell of FIG. 3.

As shown in FIG. 4, the separators 18 of each cell form a fuel gas channel 27 through which fuel gas (hydrogen) is supplied to the anode 14, and an oxidizing gas channel 28 through which oxidizing gas (oxygen, or, generally, air) is supplied to the cathode 17, such that these channels 27, 28 are located in a power generation region 51 (as shown in FIG. 5). Also, coolant channels 26 for feeding a coolant (generally, cooling water) are formed on the surfaces of the separators 18 opposite to the gas channels 27, 28. As shown in FIG. 5, fuel gas manifolds 30, oxidizing gas manifolds 31 and coolant manifolds 29 are formed in the separators 18 in a non-power-generation region 52. The fuel gas manifolds 30 communicate with the fuel gas channels 27 of the respective cells, and the oxidizing gas manifolds 31 communicate with the oxidizing gas channels 28, while the coolant manifolds 29 communicate with the coolant channels 26. Each of the separators 18 may be in the form of a carbon separator, or a metal separator, or a conductive resin separator. In the case where the separator 18 is a metal separator, the metal separator 18 may be formed of a material, such as stainless steel, aluminum or its alloy, titanium or its alloy, or magnesium or its alloy.

In operation, an ionization reaction for converting hydrogen into hydrogen ions (or protons) and electrons occurs at the anode 14 of each cell 10, and the hydrogen ions move to the cathode 17 through the electrolyte membrane 11, and combine with oxygen and electrons to produce water at the cathode 17, thereby generating electricity according to the following expressions. The electrons used for producing water at the cathode 17 may be produced at the anode of an adjacent MEA and flow to the cathode 17 through the separators, or may be produced at the anode of the cell at one end of the stack in the stacking direction and flow to the cathode of the cell at the other end through an external circuit.

At the Anode: 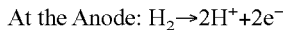

At the Cathode: 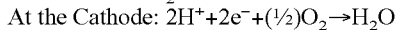

As shown in FIG. 4, various fluids (fuel gas, oxidizing gas and a coolant) are sealed from one another and from the outside. First seal members 32 provide seal between two separators 18 that sandwich the MEA of each cell 10, and second seal members 33 provide seal between adjacent ones of the cells 10. Where the separators are metal separators, resin frames 53 (frame made of a resin and having manifolds and a middle opening that extends over the power generation region 51) may be interposed between the metal separators 18 and the electrolyte membrane 11 in the non-power-generation region 52. In this case, the first seal members 32 provide seal between the metal separators 18 and the resin frames 53 and seal between the resin frames 53 and the electrolyte membrane 11. The first seal member 32 is formed of, for example, an adhesive for sealing (or sealing adhesive), and the second seal member 33 is formed of, for example, a rubber seal material, such as silicone rubber, fluororubber, or EPDM (ethylene propylene dien rubber). It is, however, to be understood that the first seal member 32 and the second seal member 33 may be both formed of an adhesive for sealing or a rubber sealing material. The resin frame 53 may be a frame made of a thermosetting resin.

Figure 2:
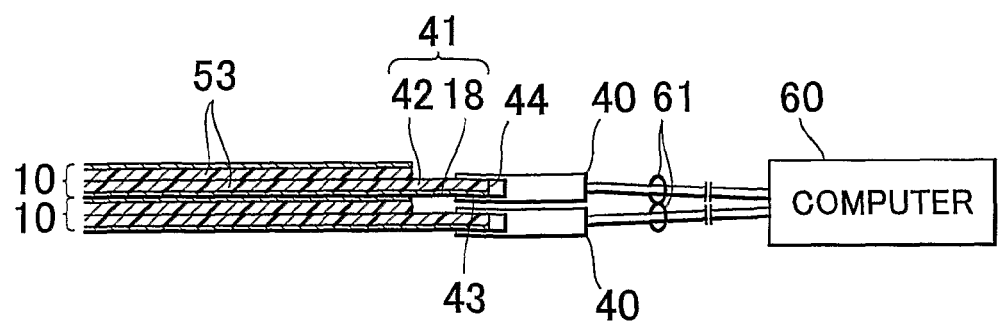
FIG. 2 is a schematic cross-sectional view (taken along line II-II in FIG. 1) of a part of the fuel cell of FIG. 1 which includes cell monitor mounting portions and their vicinities.

As shown in FIG. 2, cell monitors 40 for detecting cell information (such as cell voltage, cell temperature or other information) are mounted on cell monitor mounting portions 41 of the cells 10 in the fuel cell stack 23.

Each of the cell monitors 40 is mounted with respect to (i) each cell 10, or (ii) two or more cells, or (iii) each cell in a portion or portions of the fuel cell stack as viewed in the cell stacking direction and two or more cells in the remaining portion or portions of the fuel cell stack.

In the present embodiment, a cell monitor for measuring voltage as an example of the cell monitor will be explained. The cell monitor 40 is a terminal provided on the side of a computer (control circuit) 60. When the cell monitor 40 is attached to the fuel cell so as to contact with a conductive portion of a surface of the separator 18, the cell monitor 40 functions to conduct electricity between the computer 60 and each electrode of the cell 10 via a conductor 61, or the like. When the fuel cell consists of a plurality of cells that are stacked together, the cell monitors 40 may electrically connect the respective separators 18 of all of the cells with the computer 60, or may electrically connect one of the separators 18 of each cell with the computer 60 on the assumption that electrically continuous separators 18 of adjacent cells are at the same potential. FIG. 2 illustrates an example in which the separator 18 of one of the adjacent cells and the computer 60 are electrically connected with each other. With this arrangement, the computer 60 is able to measure electric characteristics of the cells 10, such as voltage across the electrodes of each cell. To mount the cell monitor 40 onto the fuel cell, the cell monitor 40 may sandwich or elastically hold the corresponding separator and an intermediate body (which will be described later) in the direction of the thickness of the separator, or the cell monitor 40 may engage with at least one of the separator and the intermediate body.

When each of the cell monitors 40 is mounted with respect to two or more cells, (i) only the cells 10 on which the cell monitors 40 are to be mounted may be provided with cell monitor mounting portions 41, or (ii) all of the cells 10 may be provided with cell monitor mounting portions 41, and the cell monitors 40 may be mounted on only the cells 10 on which the cell monitors 40 are to be mounted, or (iii) all of the cells 10 may be provided with cell monitor mounting portions 41, and the cell monitor 40 may be mounted on all of the cells 10, from which the computer may receive only the information of desired ones of the cells (only the signals of the cell monitors 40 for desired cells). An electric signal of each of the cell monitors 40 is transmitted to the computer (control circuit) 60, to be used as information for use in control of the operation of the cells.

Figure 1:
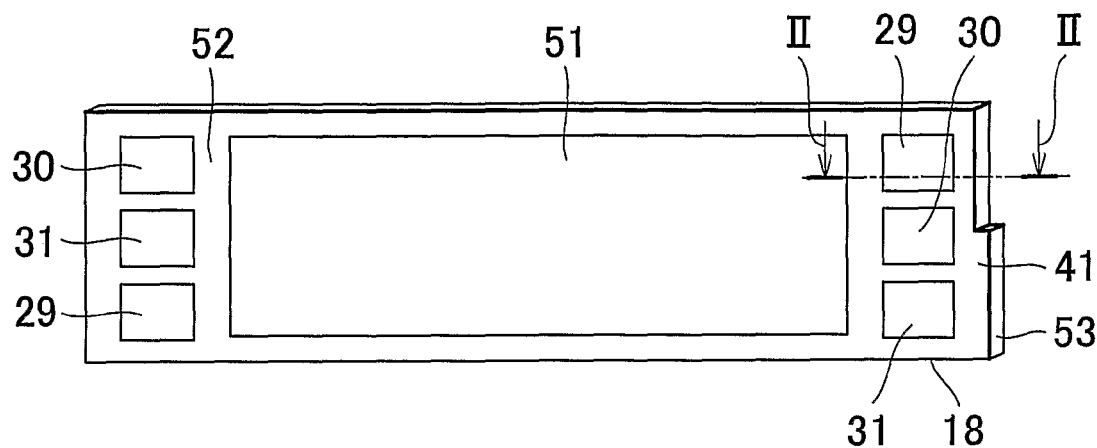
FIG. 1 is a schematic front view of a fuel cell constructed according to a first embodiment of the invention.
Figures 6A, 6B:
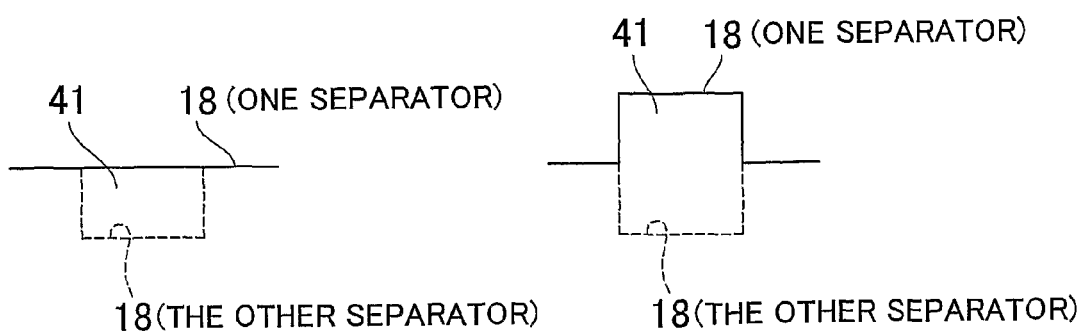
FIG. 6A is a front view showing a cell monitor mounting portion of the fuel cell of the first embodiment, more specifically, showing edges of separators of adjacent cells in an example in which an edge portion of the other of the separators is recessed from a corresponding edge portion of one of the separators.
FIG. 6B is a front view showing a cell monitor mounting portion of the fuel cell of the first embodiment, more specifically, showing edges of separators of adjacent cells in another example in which an edge portion of one of the separators protrudes while a corresponding edge portion of the other separator is recessed.

At least a part of an outer edge portion of one of a pair of separators 18 of the cell 10 is formed outside an outer edge portion of the other separator, so as to provide a cell monitor mounting portion 41 of the cell 10. In this case, the outer edge portion of the above-indicated one separator may be protruded from the outer edge portion of the other separator, as shown in FIG. 1, or the outer edge portion of the other separator may be recessed from the outer edge portion of the one separator, as shown in FIG. 6A, instead of protruding the outer edge portion of the one separator. Also, as shown in FIG. 6B, a portion of an edge of one of the separators (that is electrically connected to the cell monitor 40) to which the cell monitor 40 is attached may be protruded in the plane of the cell, and the corresponding portion of the other separator (that is not electrically connected to the cell monitor 40) may be recessed from the edge in the cell plane. The above-indicated pair of opposed separators 18 of the cell may have the same outer shape or profile at their portions other than the cell monitor mounting portion 41 of the cell 10.

The cell monitor 40 sandwiches or holds one of the opposed separators 18 (which may be an anode-side separator or a cathode-side separator) of the cell 10 and an intermediate body 42 (e.g., the resin frame 53 and/or the seal members 32, 33) interposed between the separators 18. The cell monitor 40 does not sandwich the other of the opposed separators 18 of the cell 10. The cell monitor 40 is a hold-type monitor that sandwiches or holds the cell monitor mounting portion 41 of the cell 10 therein so that the monitor 40 is fixed to and held by the cell monitor mounting portion 41 of the cell 10. Thus, the cell monitor 40 is not of a plug-in type having a plug to be inserted into a hole.

In the fuel cell 10 of this embodiment having the mutually opposed separators 18 and the intermediate body 42 interposed between the opposed separators 18, the cell monitor 40 sandwiches one of the mutually opposed separators 18 (which may be an anode-side separator or a cathode-side separator) and the intermediate body 42 (at least one intermediate body 42 in the case where there are a plurality of intermediate bodies) between the opposed separators 18. To enable the cell monitor 40 to sandwich the above-indicated one separator 18 and the intermediate body 42, it is desirable to form an end portion of the intermediate body 42 to extend to an edge of the cell monitor mounting portion 41 of the one separator 18. It is also desirable to form the other of the opposed separators 18 so as not to extend to the edge of the cell monitor mounting portion 41 of the one separator (on which the cell monitor 40 is mounted).

The intermediate body 42 is any one or ones of a member that holds an electrolyte body (e.g., the electrolyte membrane 11), a spacer or spacers (e.g., the insulating resin frame(s) 53) between the separators 18, and the seal members 32, 33. In the illustrated embodiment, the separator 18 comprises a metal separator, and the intermediate body 42 comprises the resin frame 53 serving as a spacer between the separators 18. However, the intermediate body 42 may include the separator resin frame 53 and the seal members 32, 33.

The cell monitor 40 includes a housing made of an insulating material (such as a resin), and a terminal made of a conductive material (such as a metal, for example, copper) and supported by the housing. A major surface 43 (parallel to the electrolyte membrane 11) of the separator 18 in the cell monitor mounting portion 41 on which the cell monitor 40 is mounted is in surface contact with the terminal of the cell monitor 40 for conduction of electricity therebetween. An end face 44 of the separator 18 perpendicular to the major surface 43 (parallel to the electrolyte membrane 11) in the cell monitor mounting portion 41 on which the cell monitor 40 is mounted may be or may not be in contact with the terminal of the cell monitor 40.

Figure 7:
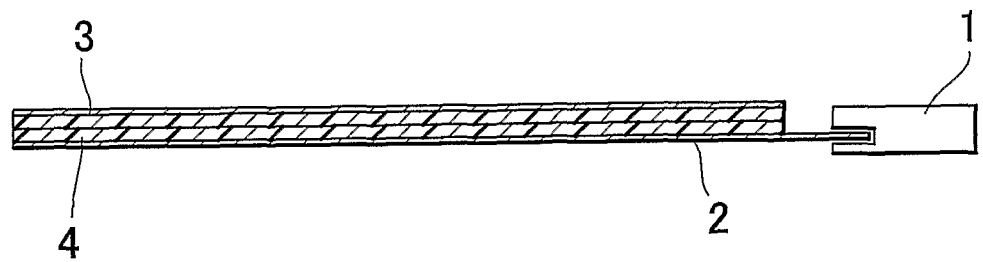
FIG. 7 is a schematic cross-sectional view of a generally known fuel cell including a cell monitor mounting portion and its vicinity.

Next, the operation and effects of the present embodiment will be explained. In the fuel cell 10 of this embodiment, the cell monitor 40 sandwiches or holds the intermediate body 42 (for example, the resin frame 53 used in the case where a metal separator is used as the separator 18) as well as the separator 18. With this arrangement, the strength and rigidity of the cell mounting portion 41 of the fuel cell are improved, as compared with the case (FIG. 7) in which the cell monitor sandwiches only the separator.

More specifically, in the case where the separator 18 comprises a metal separator, and the intermediate body 42 comprises the resin frame 53, the arrangement of this embodiment in which the cell monitor 40 sandwiches both the metal separator 18 and one or more sheets (two sheets sandwiching MEA including the electrolyte membrane 11 in FIG. 2) of resin frame(s) 63 provides improved strength and rigidity in the cell monitor mounting portion 41 of the fuel cell 10, as compared with the case (FIG. 7) where the cell monitor sandwiches only a single thin sheet of metal separator having relatively low rigidity. Consequently, the cell monitor mounting portion 41 of the cell 10 is prevented from being bent, or deformed, or broken.

In the case where the major surface 43 of the separator 18 in the cell monitor mounting portion 41 on which the cell monitor 40 is mounted is in surface contact with the terminal of the cell monitor 40 for conduction therebetween, the area of contact between the separator 18 and the cell monitor terminal can be increased, and contact resistance can be reduced, as compared with the case where an end face of a thin separator is in contact with the terminal of the cell monitor.

A second embodiment of the invention will be described with reference to FIG. 8 through FIG. 13. The fuel cell stack of the second embodiment has a construction similar to that of the fuel cell stack 23 of the first embodiment, and, therefore, will not be explained herein.

As shown in FIG. 9 through FIG. 12, cell monitors 600 for detecting cell information (such as cell voltage, cell temperature or other information) are mounted on the cells 10 of the fuel cell stack 23, such that the cell monitors 600 can be attached to or detached from engaging portions 410 of the cells 10.

Each cell 10 has an intermediate body between a pair of separators 18 (No. 1 separator and No. 2 separator), and the intermediate body is formed with the engaging portions 410. In this embodiment, where the cell 10 has metal separators 18 and resin frames 530, the resin frames 530 are regarded as the intermediate body, and the engaging portions 410 of the cell 10 are formed on the resin frame 530.

Figure 8:
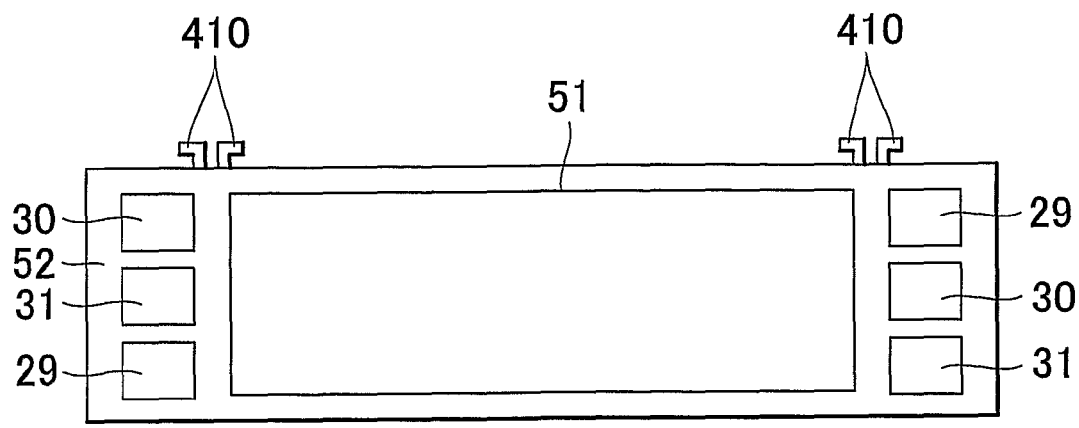
FIG. 8 is a schematic front view of a fuel cell constructed according to a second embodiment of the invention.

The engaging portions 410 of the cell 10 engage with the cell monitor 600 so as to hold the cell monitor 600 in position. The engaging portions 410 of the cell 10 protrude outwards from an edge of one side of the outline of the cell 10, for engagement with the cell monitor 600, so as to restrict movement of the cell monitor 600 away from the cell 10. For example, in the present embodiment, each of the engaging portions 410 of the cell 10 is in the form of an L-shaped claw that protrudes outwards from an edge of one side of the outline of the cell 10, and bends at its distal end portion to extend in a direction parallel to the outer edge of the cell 10, as shown in FIG. 8. When engaging with movable claws 630 of the cell monitor 600, the engaging portions 410 restrict movement of the cell monitor 600 away from the cell 10.

Figure 9:
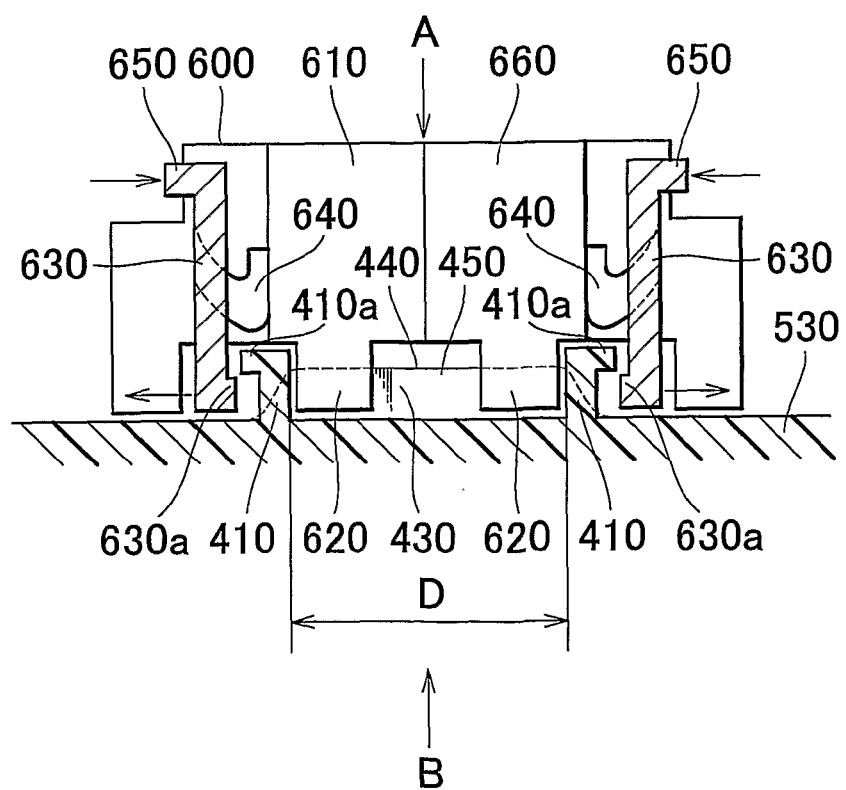
FIG. 9 is a schematic cross-sectional view of a part of the fuel cell of the second embodiment which includes a cell monitor mounting portion and its vicinity.
Figure 12:
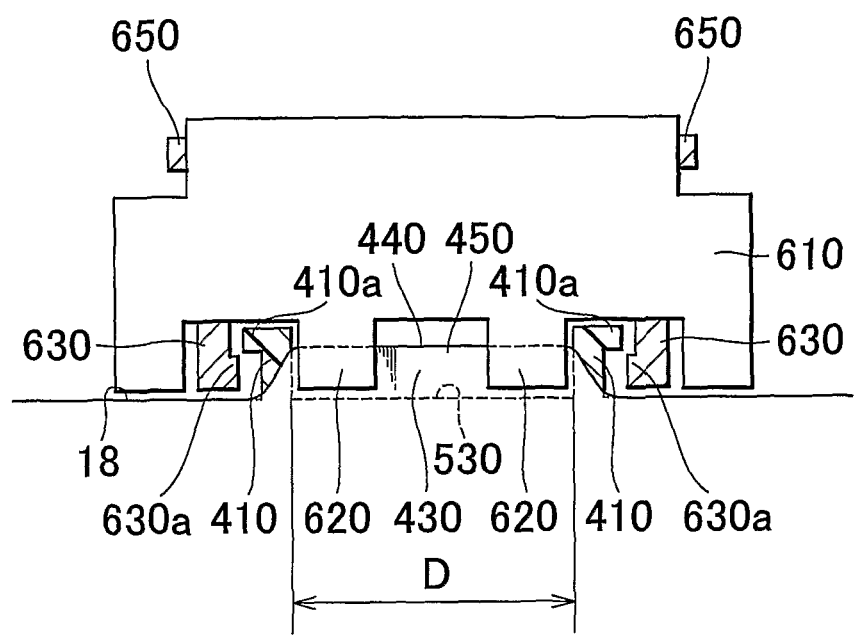
FIG. 12 is a view taken along line XII-XII in FIG. 11.

One of the above-mentioned pair of separators 18 (No. 1 separator and No. 2 separator) of the fuel cell 10 has a separator protrusion 450 that is formed at a portion of the separator 18 on which the cell monitor 600 is to be mounted and protrudes outwards from the outline of the cell 10, as shown in FIG. 9 and FIG. 12. The other separator 18 has no protrusion.

Figure 13:
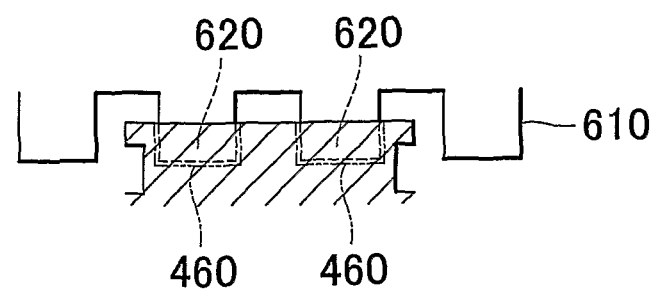
FIG. 13 is a schematic view of a modified example of the fuel cell in which two L-shaped engaging portions of FIG. 12 are replaced with a single T-shaped engaging portion.

As shown in FIG. 9 and FIG. 12, a pair of resin frames 530 as the intermediate body between the pair of separators 18 (No. 1 separator and No. 2 separator) have no protrusions like the protrusion 450 of one of the separators 18, at their positions corresponding to the protrusion 450 of the one separator 18. This arrangement makes it possible to insert separator holders 620 of the cell monitor 600 between the separator protrusions 450 of adjacent ones of the cells. In a modified example, the pair of resin frames 530 may be formed with protrusions like the protrusion 450 of the above-indicated one separator 18. In this case, the resin frames 530 are formed with grooves or recesses 460 (as shown in FIG. 13) that receive the separator holders 620 of the cell monitor 600 without interfering between the resin frames 530 and the holders 620.

Figure 10:
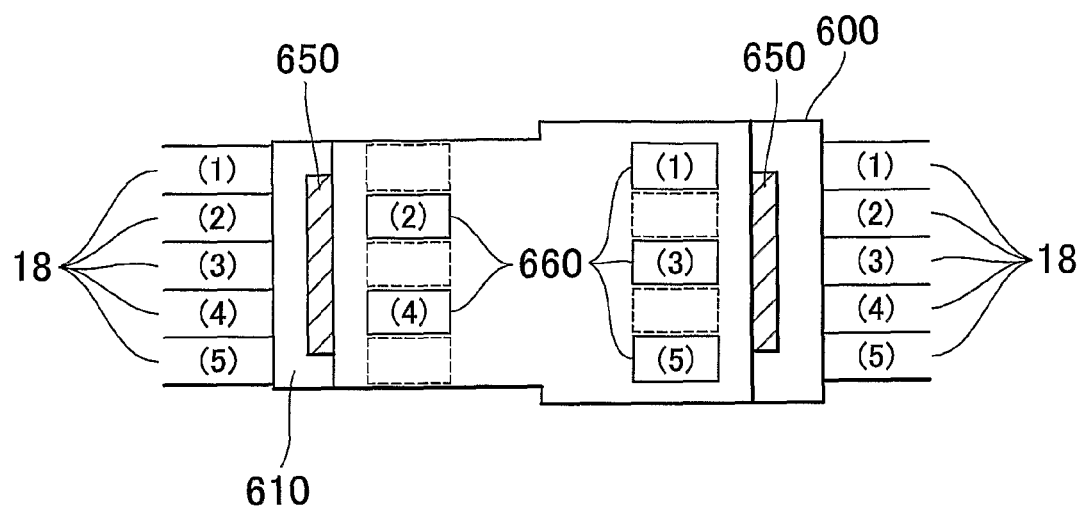
FIG. 10 is a view of the fuel cell as viewed in the direction of arrow A in FIG. 9.

As shown in FIG. 9, the cell monitor 600 has a resin housing 610, and separator holders 620 that are formed integrally with the resin housing 610 and protrude toward the cells 10 to extend in parallel with major surfaces 430 of the separator protrusions 450. The cell monitor 600 also has electrode sensing portions (cell monitor terminals) 660 (as shown in FIG. 10) formed, on the surfaces of the separator holders 620 which are opposed to the separator protrusions 450, and movable claws 630 that are movable relative to the housing 610 and can engage with the engaging portions 410 of the cells 10. The movable claws 630 are urged by springs 640 in such directions as to engage with the engaging portions 410. The movable claws 630 are formed with buttons 650 that project from the housing 610. When the buttons 650 are pushed, the movable claws 630 are moved against the bias force of the springs 640 to pivot about the springs 640, in such directions in which distal bent portions 630a of the movable claws 630 are disengaged from the engaging portions 410.

Figure 11:
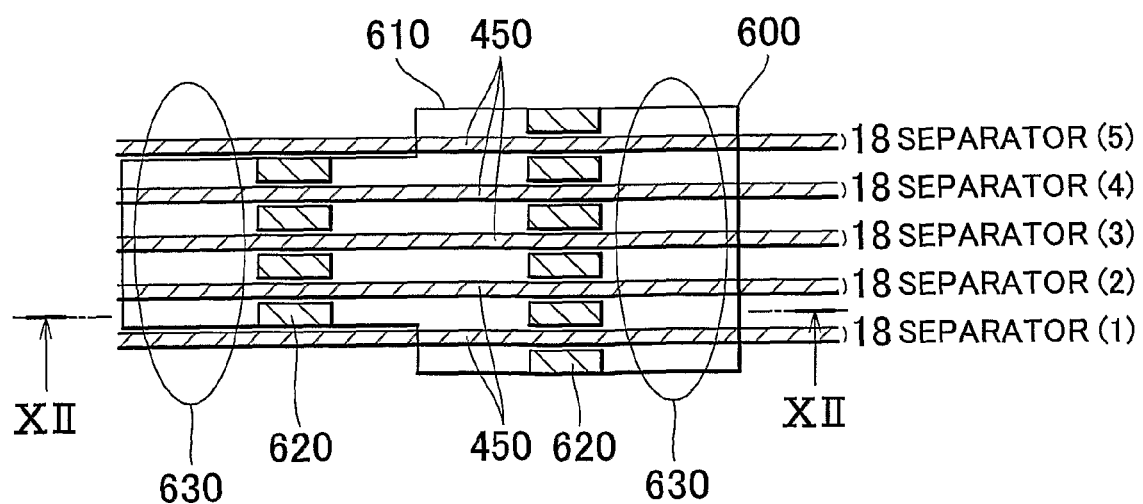
FIG. 11 is a view of the fuel cell as viewed in the direction of arrow B in FIG. 9.

As shown in FIG. 11, one cell monitor 600 monitors information about a plurality of cells 10. In the case where one cell monitor 600 monitors information about five cells 10 (the number of cells is not limited to five), for example, one cell monitor 600 has one housing 610 and ten separator holders 620 (two holders for each cell). Paired separator holders 620 of the cell monitor 600 are provided so as to be positioned at the ends of the protrusion 450, and the protrusion 450 of the one separator 18 of the cell 10 is interposed between the corresponding pairs of separator holders 620 with clearances formed between the protrusion 450 and the respective holders 620. Terminals (electrode sensing portions) 660 are formed on surfaces of the separator holders 620 which are opposed to the protrusion 450 of the above-indicated one separator 18, such that the terminals 660 contact with the one separator 18 for conduction.

The cell 10 has two or more engaging portions 410 that are spaced apart from each other in a certain direction in the cell plane, and the engaging portions 410 engage at two or more locations with two or more movable claws 630 of one cell monitor 600. In FIG. 12, each cell 10 has two. L-shaped engaging portions 410 (right and left engaging portions 410) that are spaced by distance D from each other in the cell plane. The two L-shaped engaging portions 410 have distal end portions 410a that extend from their right-angled parts in directions parallel to an edge of one side of the outline of the cell 10, such that the portions 410a point in the opposite directions to each other. The distal end portions 410a engage with the distal bent portions 630a of the movable claws 630 of the cell monitor 600 so as to restrict movement of the cell monitor 600 away from the cell 10. The separator holders 620 of the cell monitor 600 are inserted in the space D between the two L-shaped engaging portions 410. In the presence of the space D between the two L-shaped engaging portions 410, the separator holders 620 of the cell monitor 600 can be inserted into the space D without interfering with a portion of the resin frame 530 located between the engaging portions 410. If the engaging portions 410 are formed in the shape of the letter T, namely, are replaced with a single T-shaped engaging portion, the separator holders 620 of the cell monitor 600 interfere with the engaging portion; therefore, grooves (grooves 460 indicated by two-dot chain lines) must be formed in the interfering portions, as shown in FIG. 13. In this case, the grooves 460 are exposed to the protrusion 450 of the separator 18, so that the terminals 660 formed on the separator holders 620 contact with the protrusion 450.

The cell monitor 600 has cell monitor terminals (electrode sensing portions) 660 formed on the surfaces of the separator holders 620 which are opposed to the separators, and the cell monitor terminals 660 contact with the major surfaces 430 (parallel to the cell plane) of the separators 18 to be thus able to measure information (such as voltage) of the separators. The area of contact of each terminal 660 with the major surface 430 of each separator 18 is larger than that of contact of the terminal 660 with an end face 440 (FIG. 12) of the separator.

As shown in FIG. 10 and FIG. 11, in the fuel cell stack 23, one cell monitor 600 is mounted with respect to a plurality of cells 10 (for example, five cells, but the number of cells for each cell monitor is not limited to five) that are stacked together. A plurality of terminals 660 of one cell monitor 600 contact with the protrusions 450 of the separators 18 of the cells 10 at alternate positions as indicated by (1) through (5) in FIG. 10 (i.e., positions that are offset from each other in a direction parallel to the cell plate), so that the separators 18 are brought into conduction with the cell monitor 600. Namely, the terminals 660 are alternately arranged in two rows in the cell stacking direction such that the terminals 660 connected to adjacent ones of the cells 10 are located in different rows. The alternate arrangement is employed because each cell 10 has a small thickness, and the separator holders 620 need to be prevented from interfering with the protrusion 450.

The engaging portions 410 of the cell 10 are formed at asymmetrical positions in the lateral and vertical directions. For example, when the engaging portions 410 are formed asymmetrically in the vertical direction, only one of the upper and lower resin frames 530 is formed with the engaging portions 410. When the engaging portions 410 are formed asymmetrically in the lateral direction, one of right and left engaging portions 410 is formed on the one of the upper and lower resin frames 530, and the other engaging portion 410 is formed on the other lower resin frames 530. The asymmetrical arrangement of the engaging portions in the lateral or vertical direction provides a function of preventing each cell from being erroneously assembled together and preventing the cells from being erroneously stacked together. For example, if one of the cells 10 is erroneously oriented to place the engaging portions 410 upside down during stacking of the cells 10 into a cell stack, the engaging portions 410 of the erroneously oriented cell 10 appear on the side opposite to the side on which the engaging portions of the correctly oriented cells appear, whereby the error can be immediately found out through visual checking.

Next, the operation and effects of the fuel cell according to the present embodiment will be explained.

The cells 10 are stacked into the stack 23. The cell monitor 600 is mounted on each cell 10 or two or more cells, for monitoring information about the cell(s) 10. The information is transmitted to a computer for computing, and the operation of the cells 10 are controlled based on the computing results. The mounting of the cell monitor 600 on the two or more cells 10 is carried out by pushing the buttons 650 of the cell monitor 600 with a hand so as to move the movable claws 630 away from each other, inserting the cell monitor 600 to a sufficient depth until the movable claws 630 can engage with the engaging portions 410 of the cells 10, and releasing the hand from the buttons 650 so that the movable claws 630 return to their original positions under the spring force of the springs 640 for engagement with the engaging portions 410 of the cells 10. When the movable claws 630 engage with the engaging portions 410 of the cells 10, each of the separator protrusions 450 is interposed between the corresponding separator holders 620 with clearances formed therebetween, and the terminals (electrode sensing portions) 660 formed on the separator holders 620 are brought into surface contact with the protrusion 450 of the separator 18 for conduction. In this manner, the cell monitor 600 is positioned relative to the cell stack 23.

In the fuel cell of this embodiment in which the engaging portions 410 protrude outwards from outer edges of the cells, the cell monitor 600 can be mounted on and positioned relative to the cells 10 by engaging the cell monitor 600 with the engaging portions 410 and sandwiching the separator protrusions 450 by and between the separator holders 620. Since one cell monitor 600 contacts with the separators 18 of two or more cells for conduction, the cell monitor 600 can be mounted on the cells 10 with improved efficiency and easiness, as compared with the case where the cell monitor is mounted on each cell 10. Once the cell monitor 600 is mounted on the cells 10, the engaging portions 410 engage with the cell monitor 600 so as to restrict movement of the cell monitor 600 away from the cells 10, thereby preventing the cell monitor 600 from being detached from the cells 10. Also, the cell monitor 600 can be easily demounted from the cells 10 by disengaging the movable claws 630 from the engaging portions 410. Furthermore, the engaging portions 410 are in the form of protrusions, rather than recesses or holes, cell components (e.g., resin frames 530) formed with the engaging portions 410 need not have a thickness large enough to permit holes to be formed therein. Thus, even in the case where the cell components (e.g., resin frames 530) formed with the engaging portions 410 are resin frames that are used along with metal separators, it is possible to form engaging portions without reducing the rigidity and strength of the cell components (e.g., resin frames 530).

In the case where each fuel cell 10 has two or more engaging portions 410 that are spaced by distance D from each other, space that permits insertion of the separator holders 620 of the cell monitor 600 is provided between the engaging portions 410, and, therefore; the cell monitor 600 can be easily fixed and positioned while requiring only small space. Namely, the cell monitor 600 can be positioned relative to the stack 23 in the stacking direction of the cells through engagement of the separator holders 620 of the cell monitor 600 with the separator protrusions 450 in the cell stacking direction, and the cell monitor 600 can be positioned in the cell plane through engagement of the engaging portions 410 of the cells with the cell monitor 600.

In the case where the major surfaces 430 of the engaging portions 410 of the cells 10 are in surface contact with the terminals (electrode sensing portions) 660 of the cell monitor 600 for conduction between the cells 10 and the cell monitor 600, the area of contact can be made larger than that in the case where the end faces 440 of the separators having a small thickness are in contact with the terminals of the cell monitor, and, therefore, contact resistance can be reduced.

In the case where the fuel cell 10 has an intermediate body between a pair of separators, and the engaging portions 410 are formed on the intermediate body, for example, where the separators 18 comprise metal separators and the intermediate body comprises resin frames 530 while the engaging portions 410 are formed on the resin frame 530, as in the present embodiment, the cell monitor 600 can be more firmly held in position as compared with the case where the cell monitor 600 is held or supported by the metal separators 18 since the intermediate body (e.g., resin frames 530) has greater rigidity and strength than the metal separators 18.

In the case where one cell monitor 600 is mounted on a plurality of cells 10 (e.g., five cells, but the number of cells is not limited to five) that are stacked together, the efficiency of the mounting of cell monitors on the cell stack is improved as compared with the case where each cell monitor 600 is mounted on each cell 10. If one cell monitor 600 is mounted on five cells 10, for example, mounting of only one cell monitor 600 accomplishes mounting of the cell monitor on the five cells 10. In the case where the terminals (electrode sensing portions) 660 of the cell monitor 600 are electrically connected to the separators 18 of the cells 10 in the stack 23 at different positions between adjacent cells 10 (for example, at positions that are alternately arranged in two rows), each terminal (electrode sensing portion) 660 can be surely attached to each cell even if the cell 10 has a small thickness. Also, if the engaging portions 410 are formed asymmetrically in the lateral or vertical direction of the cell, erroneous mounting of the separators during assembling of each cell and stacking of the cells can be easily prevented through visual checking.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:
1. A fuel cell comprising:
an electrolyte membrane;

an anode disposed on one surface of the electrolyte membrane;
a cathode disposed on the other surface of the electrolyte membrane;
a pair of separators that are opposed to each other, between which the electrolyte membrane, the anode and the cathode are sandwiched; and
a plurality of intermediate bodies interposed between the pair of separators of a single fuel cell,
wherein a first separator of the pair of separators and one of the plurality of intermediate bodies are sandwiched by a cell monitor,
wherein a cell monitor mounting portion is formed by either:
a portion of the one of the plurality of intermediate bodies extending further toward the cell monitor than another of the plurality of intermediate bodies,
a portion of the first separator that extends further toward the cell monitor than a second separator of the pair of separators, or
both a portion of the one of the plurality of intermediate bodies that extends further toward the cell monitor than the another of the plurality of intermediate bodies and a portion of the first separator that extends further toward the cell monitor than the second separator.

2. A fuel cell according to claim 1, wherein an end portion of the one of the plurality of intermediate bodies extends to an edge portion of the cell monitor mounting portion, so as to enable the cell monitor to sandwich the first separator and the one of the plurality of intermediate bodies.

3. A fuel cell according to claim 1, wherein the one of the plurality of intermediate bodies comprises at least one of a member that functions to hold an electrolyte body, a spacer between the separators, and a seal member.

4. A fuel cell according to claim 1, wherein a major surface of the separator in the cell monitor mounting portion on which the cell monitor is mounted is in surface contact with a terminal of the cell monitor for conduction therebetween, the major surface extending in parallel with the plane of the fuel cell.

5. A fuel cell according to claim 1, wherein each of the separators comprises a metal separator, and each of the intermediate bodies comprises a resin frame that provides a spacer between the separators.

6. A fuel cell comprising:
an electrolyte membrane;
an anode disposed on one surface of the electrolyte membrane;
a cathode disposed on the other surface of the electrolyte membrane;
a pair of separators that are opposed to each other, between which the electrolyte membrane, the anode and the cathode are sandwiched; and
a plurality of intermediate bodies interposed between the pair of separators of a single fuel cell,
wherein a first separator of the pair of separators and the one of the plurality of intermediate bodies have an engaging portion that engages with a cell monitor,
wherein the engaging portion is formed by:
a portion of the one of the plurality of intermediate bodies extending further toward the cell monitor than another of the plurality of intermediate bodies, and
a portion of the first separator that extends further toward the cell monitor than a second separator of the pair of separators.

7. A fuel cell according to claim 2, wherein each of the intermediate bodies comprises at least one of a member that functions to hold an electrolyte body, a spacer between the separators, and a seal member.

8. A fuel cell according to claim 2, wherein a major surface of the separator in the cell monitor mounting portion on which the cell monitor is mounted is in surface contact with a terminal of the cell monitor for conduction therebetween, the major surface extending in parallel with the plane of the fuel cell.

9. A fuel cell according to claim 2, wherein each of the separators comprises a metal separator, and each of the intermediate bodies comprises a resin frame that provides a spacer between the separators.

* * * * *